United States Patent [19]
Takahashi

[11] Patent Number: 6,023,455
[45] Date of Patent: Feb. 8, 2000

[54] LOOPBACK CELL CONTROL SYSTEM

[75] Inventor: Yasunori Takahashi, Tokyo, Japan

[73] Assignee: NEC Corporation, Tokyo, Japan

[21] Appl. No.: 08/927,035

[22] Filed: Sep. 10, 1997

[30] Foreign Application Priority Data

Sep. 10, 1996 [JP] Japan .................................. 8-239310

[51] Int. Cl.$^7$ .......................... G08C 15/00; G06F 11/00; G01R 31/08
[52] U.S. Cl. .......................................... 370/249; 370/252
[58] Field of Search .................................. 370/248, 249, 370/252, 253, 395

[56] References Cited

U.S. PATENT DOCUMENTS

| | | | |
|---|---|---|---|
| 5,450,394 | 9/1995 | Gruber et al. | 370/253 |
| 5,563,875 | 10/1996 | Hefel et al. | 370/249 |
| 5,812,528 | 9/1998 | VanDervort | 370/249 |

FOREIGN PATENT DOCUMENTS

| | | |
|---|---|---|
| 3-71748 | 3/1991 | Japan . |
| 5-7224 | 1/1993 | Japan . |
| 8-163134 | 6/1996 | Japan . |

*Primary Examiner*—Michael Horabik
*Assistant Examiner*—Kevin C. Harper
*Attorney, Agent, or Firm*—Sughrue, Mion, Zinn, Macpeak & Seas, PLLC

[57] ABSTRACT

A loopback cell control system includes ATM apparatuses and forward and backward paths and serves to perform a loopback test by circulating a loopback cell through a route in an ATM network once. Each ATM apparatus includes a time managing section, a loopback control section, and a route delay measuring section. The timing managing section measures the elapsed time between the transmission of the loopback cell and the reception thereof, and notifies a timeout when the elapsed time exceeds a predetermined reference time. The loopback control section includes a transmission control section, a turning control section, a turning control section, a relay control section, and a reception control section. The route delay measuring section calculates a delay time in each of the forward and backward paths on the basis of the transmission time, the turning time, and the reception time notified from the loopback control section when the backward loopback cell is received as an end point, and outputs an alarm signal when each of the calculated delay times is longer than a predetermined reference time.

20 Claims, 5 Drawing Sheets

LOOPBACK CELL CONTROL SYSTEM

BACKGROUND OF THE INVENTION

The present invention relates to a loopback cell control system for measuring the time spent to perform transmission through forward paths by using a plurality of ATM (Asynchronous Transfer Mode) apparatuses and the time spent to perform transmission through backward paths in a loopback test in an ATM switching network and, more particularly, to a loopback cell control system which can monitor a delay time in each transmission path.

To test the normalities of a plurality of ATM apparatuses and transmission paths in a conventional ATM switching network, various loopback cell control systems have been proposed, which are designed to transfer a test loopback cell through an arbitrary route and check the validity of the loopback cell after it is circulated once.

Figure 5:
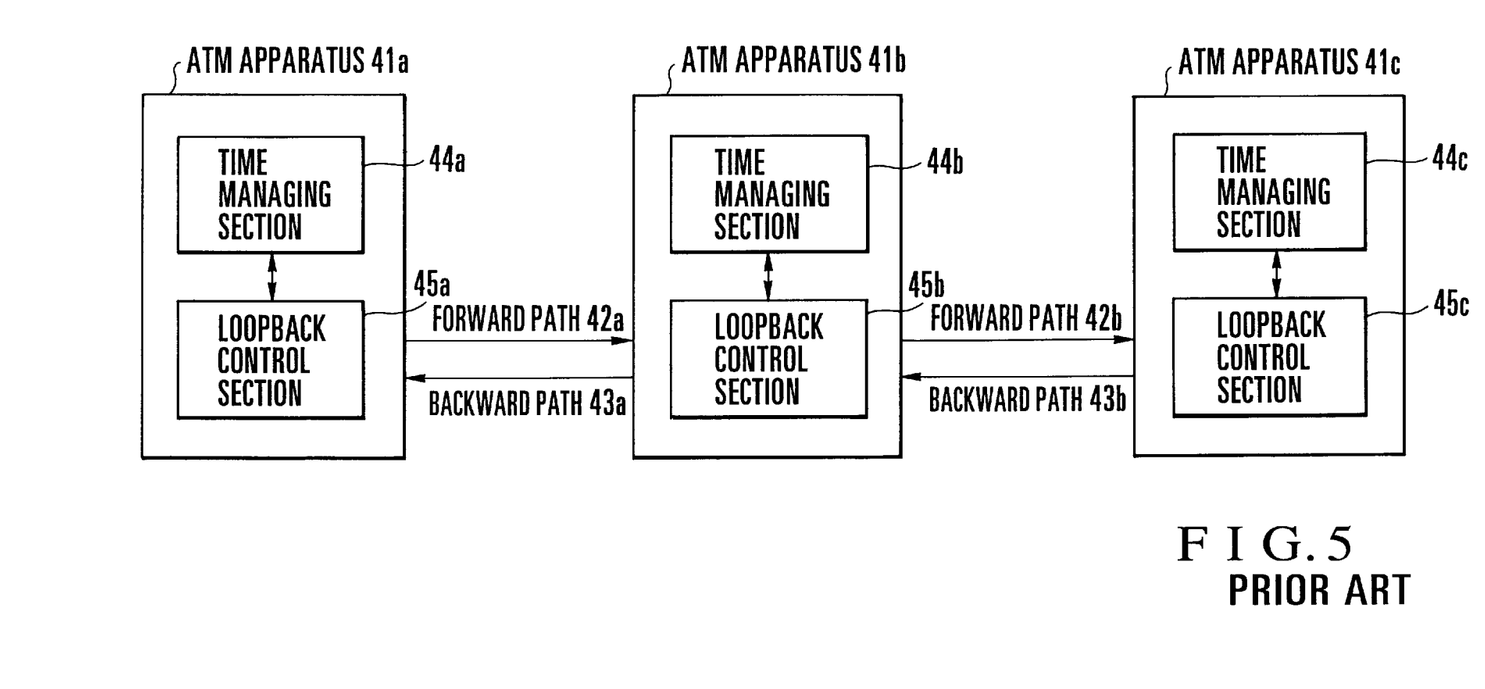
FIG. 5 is a block diagram for explaining the arrangement of a conventional loopback cell control system.

FIG. 5 shows a conventional loopback cell control system. Referring to FIG. 5, three ATM apparatuses 41a, 41b, and 41c are cascaded through two forward paths 42a and 42b and two backward paths 43a and 43b to constitute an ATM switching network. The ATM apparatuses 41a, 41b, and 41c respectively include time managing sections 44a, 44b, and 44c and loopback control sections 45a, 45b, and 45c. The ATM apparatuses 41a, 41b, and 41c are performing a loopback test by transmitting a test loopback cell to each other.

Figure 6:
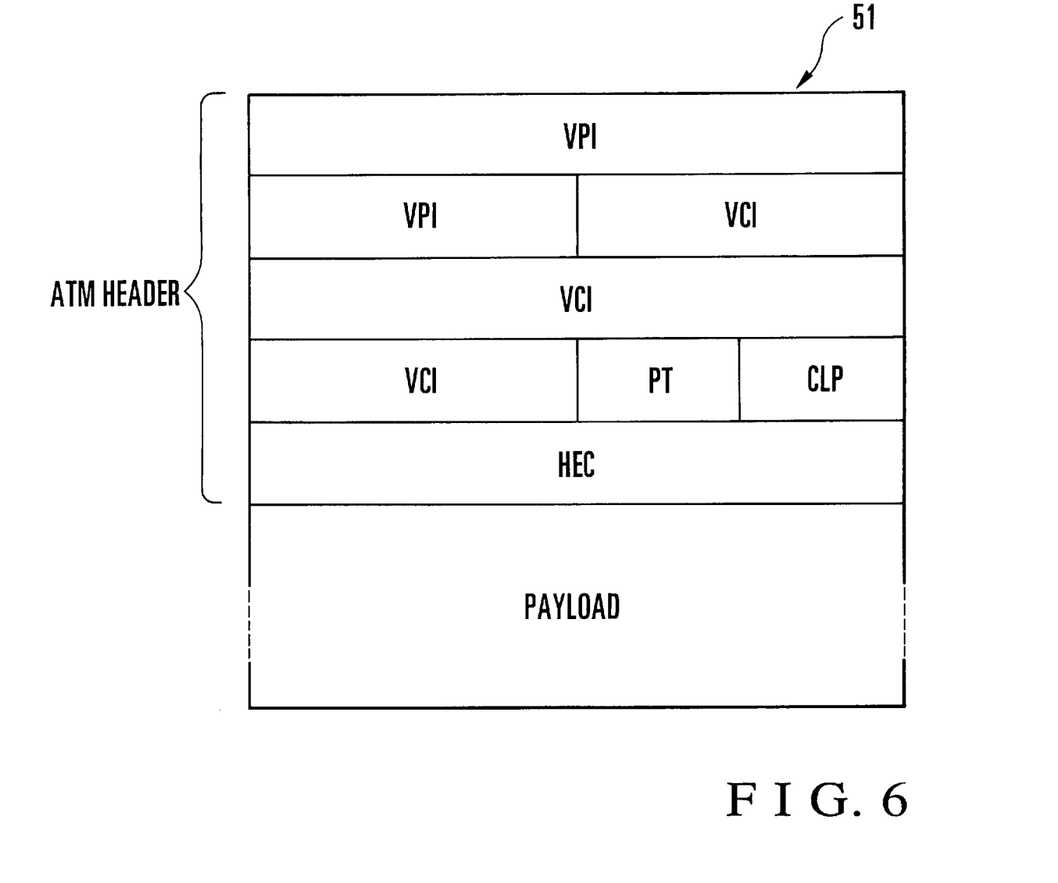
FIG. 6 is a view showing the format of an ATM cell.

FIG. 6 shows the format of a conventional ATM cell. An ATM cell 51 is constituted by a 5-byte ATM header and a 48-byte payload which is an information field. This ATM header has a 12-bit VPI (Virtual Path Identifier), a 16-bit VCI (Virtual Channel Identifier), a 3-bit PT (Payload Type), a 1-bit CLP (Cell Loss Priority), and a 1-byte HEC (Header Error Control).

The ATM header is used to interface between ATM switching networks. Some ATM header is used to interface with a user network. In such an ATM header, a 4-bit GFD (Generic Flow Control) is added to 1-byte data defined in the ATM apparatuses 41a, 41b, and 41c to form a 12-bit VPI.

In the system having the above arrangement, the control section 45a of the ATM apparatus 41a generates one loopback cell, indicates that this cell is a test loopback cell, and enters a test value determined by the manager of the ATM switching network in the cell. In addition, after the ATM apparatus 41c is set as a turning point, and the ATM apparatus 41a is set as a start point, CRC (Cyclic Redundancy Check) operation is performed.

Subsequently, the designation of a VPI and a VCI which are to be tested is added to this test loopback cell, and the resultant cell is inserted in an idle time between the respective user cells and transmitted through the forward path 42a. In addition, the time managing section 44a is notified of the transmission of the loopback cell. The time managing section 44a then start measuring the elapsed time while holding the current time. In the ATM apparatus 41b, the loopback control section 45b receives a loopback cell from the ATM apparatus 41a, recognizes that the ATM apparatus 41b itself is a passing point, and transfers the cell to the ATM apparatus 41c through the forward path 42b.

In the ATM apparatus 41c, the loopback control section 45c receives the loopback cell and recognizes that the ATM apparatus 41c itself is a turning point. The loopback control section 45c rewrites the loopback cell into a backward loopback cell, and returns it to the ATM apparatus 41b through the backward path 43b. In the ATM apparatus 41b, the loopback control section 45b recognizes that the ATM apparatus 41b itself is a passing point as in the case of reception through the forward path 42a, and transfers the backward loopback cell to the ATM apparatus 41a through the backward path 43a.

In the ATM apparatus 41a, the loopback control section 45a receives the backward loopback cell and recognizes that the ATM apparatus 41a itself is an end point. The loopback control section 45a then recognizes the test value and notifies the time managing section 44a of the backward loopback cell. The time managing section 44a stops measuring the elapsed time upon reception of this notification, and clears the measured value. If the backward loopback cell is not received by the ATM apparatus 41a within a predetermined reference time monitored by the time managing section 44a due to some trouble, the time managing section 44a notifies the loopback control section 45a of a timeout. As a result, a loopback failure is recognized.

Since the reference time monitored by the time managing section 44a is set to be sufficiently longer than the sum of delay times in the forward paths 42a and 42b and the backward paths 43a and 43b, no loopback cell causes a timeout due to a normal delay.

When each transmission path is to be tested by using such a conventional loopback cell control system, the following problems are posed.

First, since the elapsed time until the reception of a loopback cell is measured as the overall elapsed time through the entire route for a loopback cell test, a delay time in each of the forward paths 42a and 42b and the backward paths 43a and 43b cannot be evaluated.

Second, even if some abnormality occurs in the ATM apparatus 41b or 41c, and an abnormal delay occurs in only the forward paths 42a and 42b or the backward paths 43a and 43b, when the backward loopback cell is received within a reference time, it is determined that the system is normal because of the first problem.

SUMMARY OF THE INVENTION

It is an object of the present invention to provide a loopback cell control system which can monitor a delay time in each transmission path in a loopback test in an ATM switching network.

In order to achieve the above object, according to the present invention, there is provided a loopback cell control system comprising a plurality of ATM apparatuses, each adapted to generate information about a loopback as a loopback cell according to a predetermined format of an ATM cell, and transmitting the loopback cell while controlling transmission/reception, passing, and returning of the cell, and a plurality of forward paths and a plurality of backward paths as transmission paths through which the ATM apparatuses are cascaded, the ATM apparatuses and the transmission paths constituting an ATM network, the loopback cell control system being adapted to perform a loopback test by circulating the loopback cell through a predetermined route in the ATM network once, and each of the ATM apparatuses including time managing means for counting the current time, measuring an elapsed time between the transmission of the loopback cell and the reception thereof, and notifying a timeout when the elapsed time exceeds a predetermined reference time, loopback control means constituted by transmission control means for, when the loopback cell is transmitted as a start point, transmitting the loopback cell to one of the forward paths and acquiring a transmission time from the time managing means, turning control means for, when the loopback cell is received as a turning point, writing turning time in the received loopback cell and transmitting the cell as a backward loopback cell to one of the backward paths, relay control means for, when the loopback cell and the backward loopback cell are received as a passing point, allowing the received loopback cell and the received backward loopback cell to pass therethrough, and reception control means for, when the backward loopback cell is received as an end point, checking validity of the received backward loopback cell first, then acquiring a reception time from the time managing means, and reading the turning time written in the backward loopback cell, and delay measuring means for, when the backward loopback cell is received as an end point, calculating a delay time in each of the forward and backward paths on the basis of the transmission time, the turning time, and the reception time notified from the loopback control means, and outputting an alarm signal when each of the calculated delay times is longer than a predetermined reference time.

DESCRIPTION OF THE PREFERRED EMBODIMENT

The present invention will be described in detail below with reference to the accompanying drawings.

Figure 1:
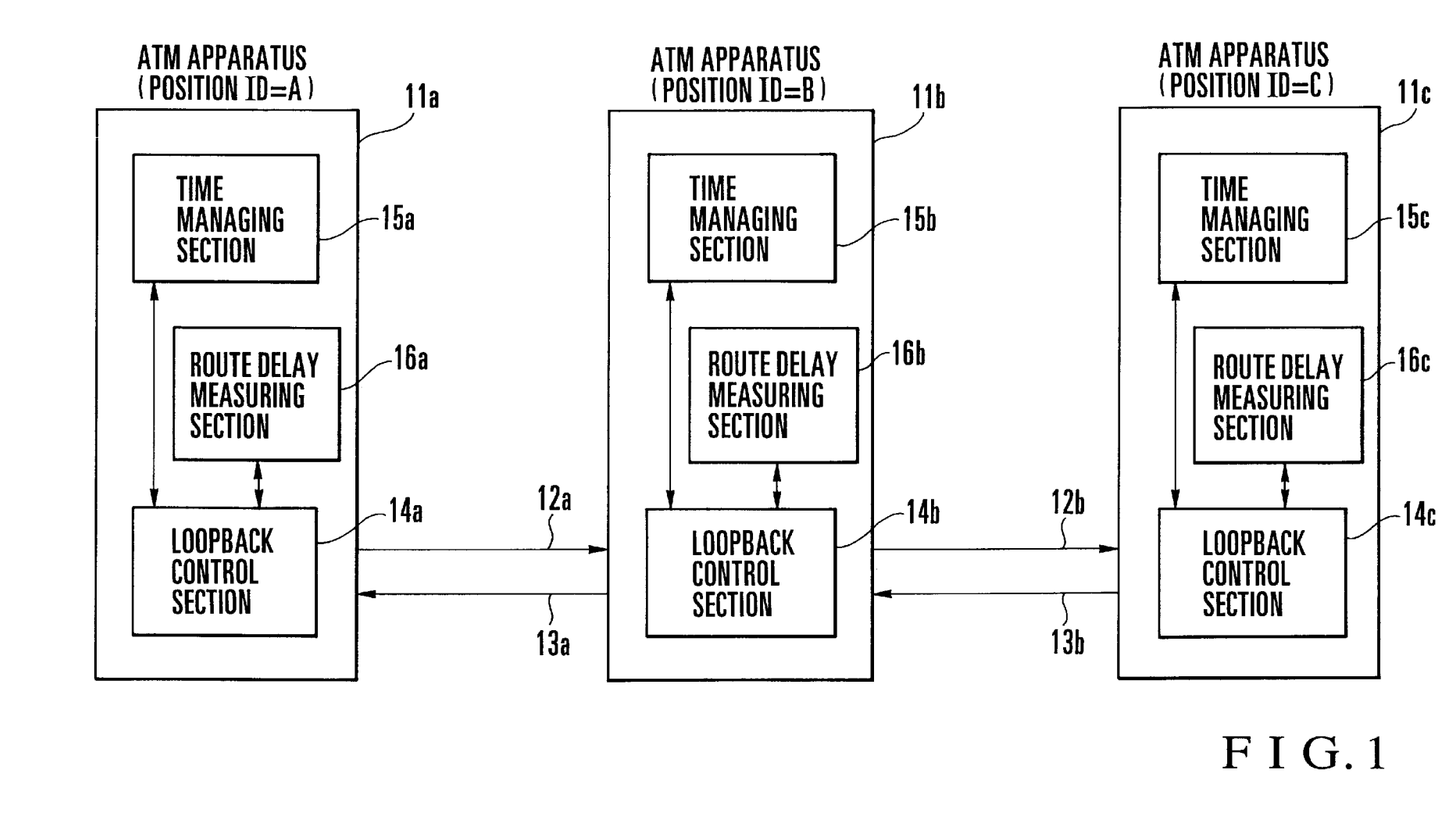
FIG. 1 is a block diagram showing the arrangement of a loopback cell control system according to an embodiment of the present invention.

FIG. 1 shows the arrangement of a loopback cell control system according to an embodiment of the present invention. Referring to FIG. 1, an ATM switching network is constituted by ATM apparatuses 11a, 11b, and 11c, and forward paths 12a and 12b and backward paths 13a and 13b as transmission paths through which the ATM apparatuses 11a, 11b, and c are cascaded.

The ATM apparatuses 11a, 11b, and 11c respectively include loopback control sections 14a, 14b, and 14c for controlling a loopback test, time managing sections 15a, 15b, and 15c for managing the elapsed time between the current time and the instant at which a loopback cell is received, and route delay measuring sections 16a, 16b, and 16c for measuring a delay time in a specific route.

Figure 4:
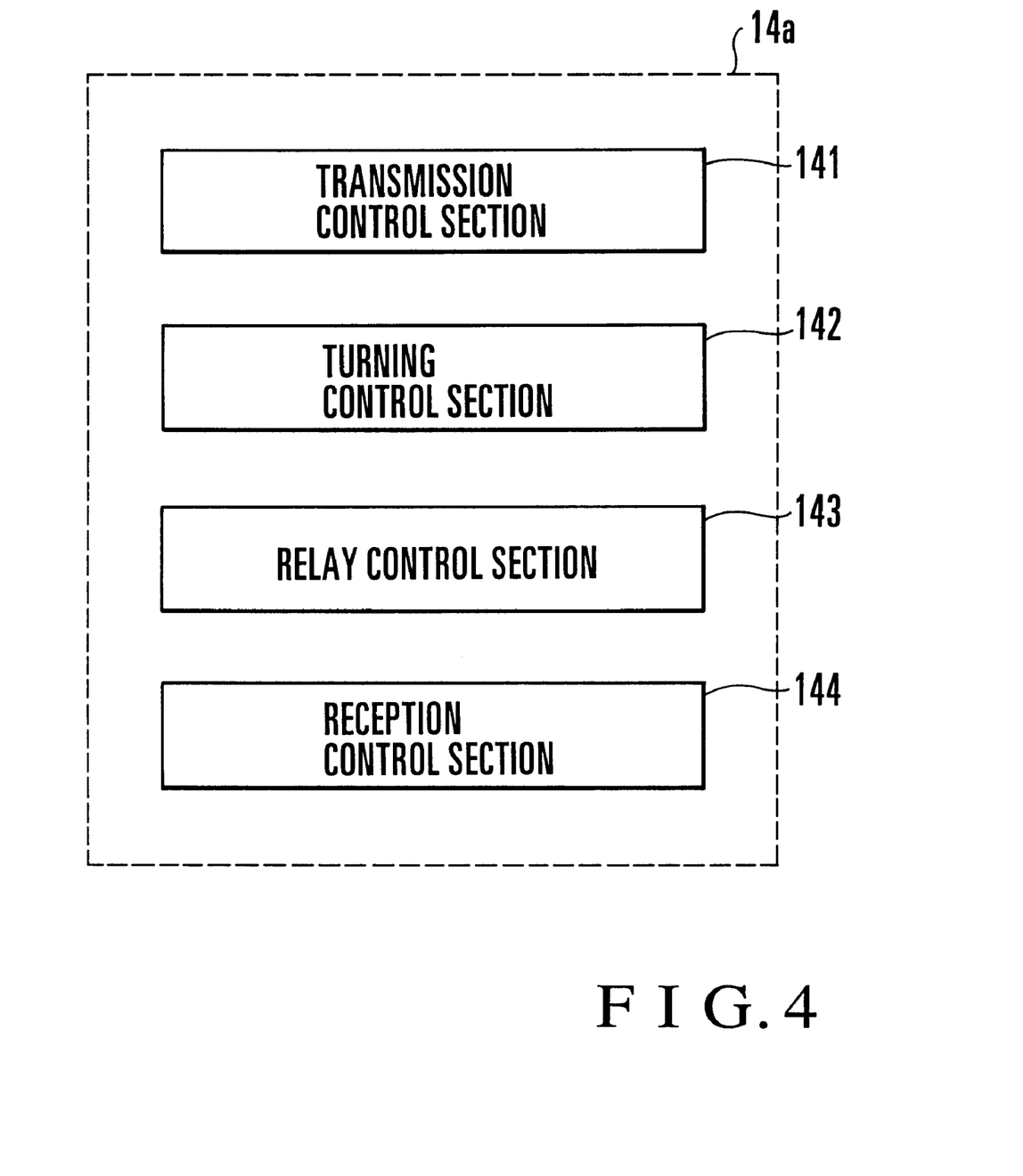
FIG. 4 is a block diagram showing the schematic arrangement of a loopback control section in FIG. 1.

As shown in FIG. 4, the loopback control sections 14a, 14b, and 14c respectively include transmission control sections 141 for generating test loopback cells according to a predetermined format when the corresponding ATM apparatuses are set as the start points of loopback tests, transmitting the generated loopback cells to transmission paths, and notifying the time managing sections 15a, 15b, and 15c of the transmission of the loopback cells, turning control sections 142 for returning the received loopback cells to transmit backward loopback cells upon recognizing the corresponding ATM apparatuses as turning points, relay control sections 143 for relaying the received loopback cells and the backward loopback cells upon recognizing the corresponding ATM apparatuses as relay points, and reception control sections 144 for checking the validity of the loopback cells after they are circulated once upon reception of the backward loopback cells corresponding to the transmitted loopback cells, and notifying the time managing sections 15a, 15b, and 15c of the reception of the loopback cells. Although FIG. 4 shows the arrangement of the loopback control section 14a alone, the loopback control sections 14b and 14c have the same arrangement.

Each of the time managing sections 15a, 15b, and 15c counts the current time and measures the elapsed time until the reception of a loopback cell. That is, each time managing section starts measuring the elapsed time upon reception of a notification indicating the transmission of a loopback cell from a corresponding one of the loopback control sections 14a, 14b, and 14c, and stops measuring the elapsed time upon reception of a notification indicating the reception of the loopback cell. A predetermined reference time is set in each of the time managing sections 15a, 15b, and 15c in advance. When each of the time managing sections 15a, 15b, and 15c does not receive a notification indicating the reception of a loopback cell from a corresponding one of the loopback control sections 14a, 14b, and 14c, each time managing section notifies a corresponding one of the loopback control sections 14a, 14b, and 14c of a timeout.

Each of the reference times set in the time managing sections 15a, 15b, and 15c is constituted by an overall reference time for monitoring the elapsed time in the entire route and an individual reference time for monitoring the elapsed time in each transmission path. In general, the delays allowed in the forward paths 12a and 12b and the backward paths 13a and 13b differ from each other. For this reason, the overall reference time is set to be sufficiently longer than the sum of the respective delays. Even if, therefore, these normal delays occur at once, no timeout occurs. In contrast to this, a margin is provided for each of the individual reference times with respect to only the delay allowed in each of the pairs of the forward paths 12a and 12b and the backward paths 13a and 13b or each of the forward paths 12a and 12b and the backward paths 13a and 13b.

Figure 2:
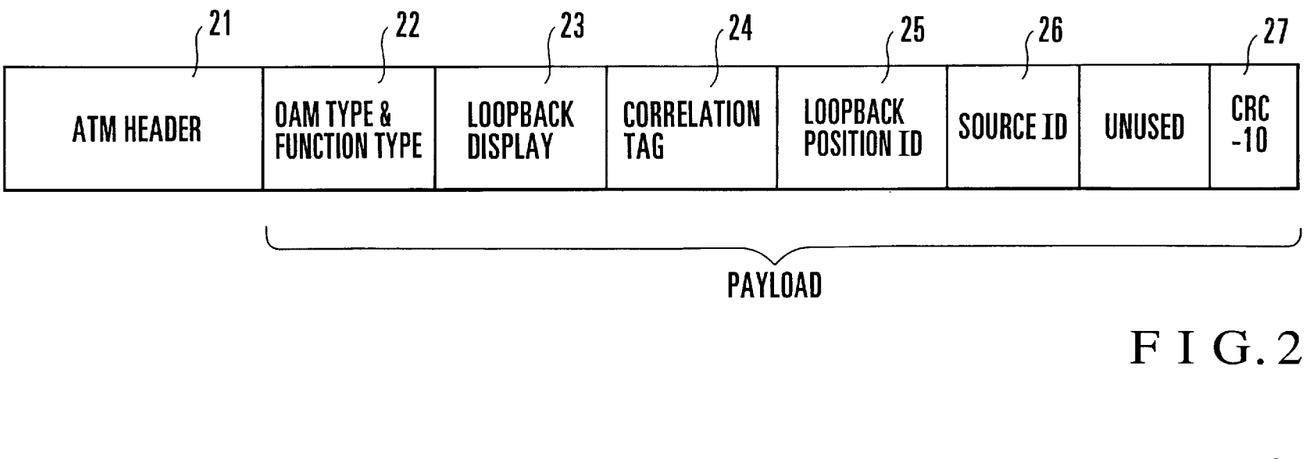
FIG. 2 is a view showing the format of a loopback cell used in the loopback cell control system in FIG. 1.

FIG. 2 shows the format of a loopback cell used in the system in FIG. 1. This loopback cell is an ATM cell used for a loopback test, which is defined in ITU-T Recommendation 1.610, November 1994 or the like. The payload as the information field of this cell includes an OAM type & function type 22 indicating that the cell is an OAM (Operation And Maintenance) cell for a loopback test, a loopback display 23 indicating that the cell is a loopback cell in a forward path or a backward loopback cell in a backward path, and a correlation tag 24 indicating the correlation between a plurality of loopback cells.

In addition, this cell includes a loopback position ID 25 indicating the ID of an ATM apparatus serving as a turning point, a source ID 26 indicating the ID of an ATM apparatus serving as a start point, and a CRC-10 27 indicating a CRC calculation result with respect to this information field and used for error detection. An ATM header 21 like the one shown in FIG. 5 is added to the head of this payload to constitute an ATM cell.

A loopback test in which a loopback cell is transmitted from the ATM apparatus 11a to the transmission path and returned at the ATM apparatus 11c will be described next. Assume that the position of the ATM apparatus 11a is represented by ID=A; the position of the ATM apparatus 11b, by ID=B; and the position of the ATM apparatus 11c, by ID=C. In the ATM apparatus 11a, the transmission control section 141 of the loopback control section 14a sets the loopback display 23 at logic "1", the correlation tag 24 to a predetermined value determined by the manager of the ATM switching network, the loopback position ID 25 to the position ID=C of the ATM apparatus 11c, the source ID 26 to the position ID=A of the ATM apparatus 11a, and the CRC-10 27 to the CRC calculation value of the payload, thereby generating a loopback cell.

Subsequently, a VPI and a VCI which are to be tested are added to this loopback cell. The resultant cell is inserted in the idle time between user cells and transmitted through the forward path 12a. At the same time, the loopback control section 14a notifies the time managing section 15a of the transmission of the loopback cell, acquires the current time from the time managing section 15a, and notifies the route delay measuring section 16a of the current time as the transmission time. This transmission time is held by the route delay measuring section 16a. The time managing section 15a starts measuring the elapsed time on the basis of the current time upon reception of the transmission notification from the loopback control section 14a.

In the ATM switching network, the band that the user can use is generally limited with respect to the band of a transmission path. For this reason, an idle cell indicating an idle state is inserted in the remaining part of the band to set an idle time. The loopback control section 14a therefore inserts the loopback cell in the idle time by overwriting the cell on the idle cell.

In the ATM apparatus 11b, the loopback control section 14b receives the loopback cell from the ATM apparatus 11a. The relay control section 143 of the loopback control section 14b checks the loopback display 23 to recognize that the cell is not a backward loopback cell in the backward path but is a loopback cell in the forward path. In addition, the loopback control section 14b compares the loopback position ID 25 with the position ID=B of the apparatus 11b to recognize that the apparatus is not at the loopback position. As a result of the above recognition, the relay control section 143 of the ATM apparatus 11b allows the received loopback cell to pass therethrough to transfer it to the ATM apparatus 11c.

In the ATM apparatus 11c, the loopback control section 14c receives, checks, and compares the loopback cell in the same manner as in the ATM apparatus 11b. In this case, since the loopback cell is a loopback cell in the forward path, and the loopback position ID 25 coincides with the position ID=C of the ATM apparatus 11c, the turning control section 142 changes the loopback display 23 to logic "0".

In this case, the turning control section 142 of the loopback control section 14c acquires the current time from the time managing section 15c and overwrites it on the used loopback position ID 25. The turning control section 142 then sets the CRC-10 27 as the new CRC calculation value of the payload, thus generating a backward loopback cell. The generated backward loopback cell is inserted in the idle time in the backward path 13b to be transmitted to the ATM apparatus 11b.

In the ATM apparatus 11b, the loopback control section 14b receives and checks the loopback cell in the same manner as in the case of the reception of the cell in the forward path 12a. When the relay control section 143 of the loopback control section 14b recognizes on the basis of the loopback display 23 that the received loopback cell is a backward loopback cell, the relay control section 143 checks the source ID 26. In this case, the relay control section 143 recognizes that the source ID 26 differs from the position ID=B of the ATM apparatus 11b, and allows the backward loopback cell to pass therethrough to transfer it to the ATM apparatus 11a.

In the ATM apparatus 11a, the loopback control section 14a receives and checks the backward loopback cell in the same manner as in the ATM apparatus 11b. The reception control section 144 of the loopback control section 14a recognizes on the basis of the loopback display 23 that the received cell is a backward loopback cell, and that the source ID 26 coincides with ID=A of the ATM apparatus 11a. In addition, the reception control section 144 collates the correlation tag 24 with a predetermined value to check the validity of the loopback cell. In this case, the reception control section 144 of the loopback control section 14a reads the turning time at the ATM apparatus 11c from the loopback position ID 25, and acquires the reception time from the time managing section 15a. The route delay measuring section 16a is notified of the turning time, the reception time, and the reception of the backward loopback cell as well as the transmission time which has been notified. Note that the transmission time may be held in the loopback control section 14a to be notified to the route delay measuring section 16a, together with the remaining data, at the time of the reception of the cell.

The route delay measuring section 16a stops measuring the elapsed time in response to the notification of the reception of the backward loopback cell, and clears the measurement value. Subsequently, the route delay measuring section 16a calculates the delay time in the two forward paths 12a and 12b from the transmission time and the turning time, and also calculates the delay time in the two backward paths 13a and 13b from the turning time and the reception time.

If both the two calculation results are equal to or shorter than predetermined individual reference times, the loopback control section 14a determines that no abnormality has occurred in the ATM apparatuses 11a, 11b, and 11c, the forward paths 12a and 12b, and the backward paths 13a and 13b. In contrast to this, if the delay time in the forward paths 12a and 12b is longer than the corresponding individual reference time, the loopback control section 14a determines that some abnormality has occurred in the ATM apparatuses 11a, 11b, and 11c or the forward paths 12a and 12b. If the delay time in the backward paths 13a and 13b is longer than the corresponding individual reference time, the loopback control section 14a determines that some abnormality has occurred in the ATM apparatuses 11a, 11b, and 11c or the backward paths 13a and 13b. If abnormality is determined, an alarm display (output) operation is performed.

If the backward loopback cell is not received within the predetermined overall reference time due to some critical trouble, the time managing section 15a notifies the loopback control section 14a of a timeout after an elapse of the overall reference time. Upon this notification, the loopback control section 14a recognizes a loopback test failure, and performs an alarm display operation. If a loopback test failure is recognized again after the loopback test is retried, the occurrence of a critical abnormality may be determined, and a second alarm display operation may be performed.

Figure 3:
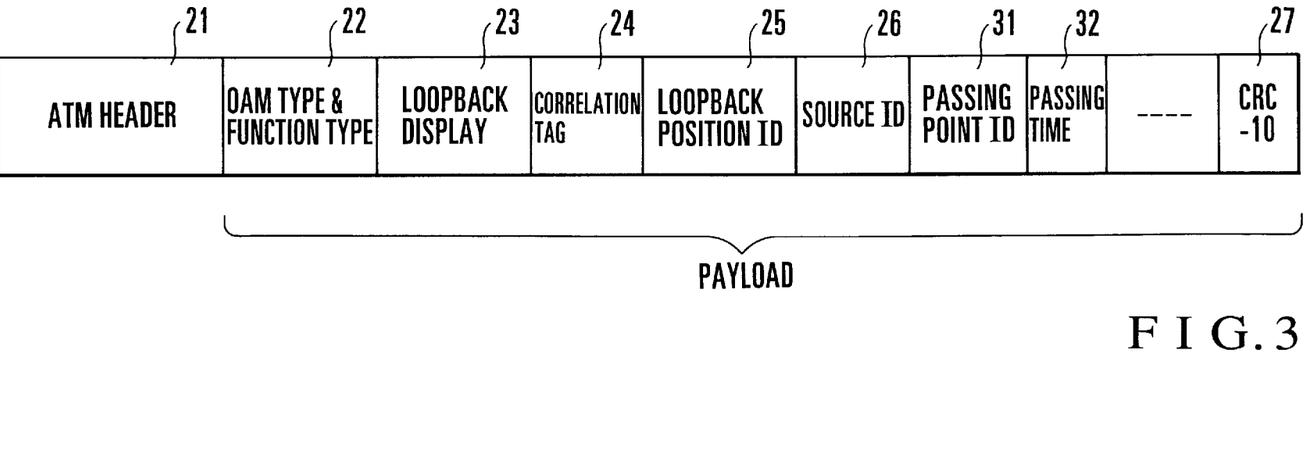
FIG. 3 is a view showing the format of another loopback cell used in the loopback cell control system in FIG. 1.

FIG. 3 shows the format of another loopback cell. The loopback cell shown in FIG. 3 is the same as that shown in FIG. 2 except that information about at least one passing point is further written in the unused area of the payload. That is, this unused area is a variable-length write area.

Information about each passing point is constituted by a passing point ID 31 which is the position ID=B of the ATM apparatus 11b as a passing point, and a passing time 32 which is the current time when a loopback cell or a backward loopback cell passes through the ATM apparatus 11b.

A loopback test in which the loopback cell in FIG. 3 is transmitted from the ATM apparatus 11a in the system shown in FIG. 1 will be described next. First of all, in the ATM apparatus 11a, the transmission control section 141 of the loopback control section 14a generates a loopback cell and transmits it to the forward path 12a. At the same time, the transmission control section 141 of the loopback control section 14a notifies the time managing section 15a of the transmission of the loopback cell, acquires the current time from the time managing section 15a, and notifies the route delay measuring section 16a of the current time as a transmission time. The time managing section 15a starts measuring the elapsed time from the transmission time in response to the notification of the transmission of the loopback cell.

In the ATM apparatus 11b, the loopback control section 14b receives, checks, and recognizes the loopback cell in the same manner as described above. The relay control section 143 of the loopback control section 14b writes the position ID=B of the ATM apparatus 11b in the passing point ID 31 of the loopback cell. The relay control section 143 then acquires the current time from the time managing section 15b and writes it in the passing time 32. Thereafter, the relay control section 143 inserts the loopback cell in the idle time in the forward path 12b and transmits it to the ATM apparatus 11c.

In the ATM apparatus 11c, the turning control section 142 of the loopback control section 14c generates a backward loopback cell, and transmits it to the ATM apparatus 11b in the same manner as described above.

In the ATM apparatus 11b, the loopback control section 14b checks, compares, and recognizes the backward loopback cell in the same manner as in the reception of the cell in the forward path 12a. The relay control section 143 of the loopback control section 14b then writes the position ID=B in a new passing point ID 31 of the loopback cell. In addition, the relay control section 143 acquires the current time from the time managing section 15b and writes it in another area of the passing time 32. Thereafter, the relay control section 143 transmits the backward loopback cell to the ATM apparatus 11a through the backward path 13a.

In the ATM apparatus 11a, the reception control section 144 of the loopback control section 14a receives the backward loopback cell and checks the validity of the cell in the same manner as described above. The reception control section 144 sends the two passing times at the passing point ID 31 in the forward and backward paths to the route delay measuring section 16a, together with the transmission time, the turning time, the reception time, and the notification of the reception of the backward loopback cell.

The route delay measuring section 16a calculates the delay time in each of the forward paths 12a and 12b and the backward paths 13a and 13b, the delay times in the two forward paths 12a and 12b and the two backward paths 13a and 13b, and the delay time in the entire route.

Subsequently, the loopback back control section 14a performs a first alarm display operation on the basis of the delay times in the two forward paths 12a and 12b and the two backward paths 13a and 13b and the delay time in the entire route as in the same manner as described above. If the delay time in each of the forward paths 12a and 12b and the backward paths 13a and 13b is shorter than a corresponding one of the predetermined individual reference times, the loopback control section 14a determines that some abnormality has occurred in each of the ATM apparatuses 11a, 11b, and 11c, each of the forward paths 12a and 12b, or each of the backward paths 13a and 13b, and performs a second alarm display operation different from the first alarm display operation.

The present invention is not limited to the above embodiment. For example, the present invention can be applied to an ATM switching network constituted by four or more ATM apparatuses and three or more transmission paths. Various changes and modifications of the embodiment can be made without departing from the spirit and scope of the invention.

As has been described above, the loopback cell control system of the present invention has the following effects.

First, since the turning time in the ATM apparatus at the turning point is written in a backward loopback cell, and each delay time in a forward or backward path is measured from this turning time, the normality with respect to a local delay time in the transmission route can be evaluated specifically.

Second, since the passing time in the ATM apparatus at each passing point is written in a backward loopback cell, and a delay time in each transmission path is measured from each passing time, the normality with respect to the delay time in each transmission path can be evaluated. A trouble can therefore be located to allow quick restoration.

A loopback cell control system which can monitor a delay time in each transmission path in a loopback test in an ATM switching network can therefore be provided.

What is claimed is:

1. A loopback cell control system comprising:
   a plurality of ATM apparatuses, each adapted to generate information about a loopback as a loopback cell according to a predetermined format of an ATM cell, and transmitting the loopback cell while controlling transmission/reception, passing, and returning of the cell; and
   a plurality of forward paths and a plurality of backward paths as transmission paths through which said ATM apparatuses are cascaded, said ATM apparatuses and said transmission paths constituting an ATM network,
   said loopback cell control system being adapted to perform a loopback test by circulating the loopback cell through a predetermined route in said ATM netwvork once, and
   each of said ATM apparatuses including:
   time managing means for counting the current time, measuring an elapsed time between the transmission of the loopback cell and the reception thereof, and notifyg a timeout when the elapsed time exceeds a predetermined reference time;
   loopback control means constituted by transmission control means for, when the loopback cell is transmitted at a start point, transmitting the loopback cell to one of said forward paths and acquiring a transmission time from said time managing means, turning control means for, when the loopback cell is received at a turning point, writing turning time in the received loopback cell and transmitting the cell as a backward loopback cell to one of the backward paths, relay control means for, when the loopback cell and the backward loopback cell are received at a passing point, allowing the received loopback cell and the received backward loopback cell to pass therethrough, and reception control means for, when the backward loopback cell is received at an end point, checking validity of the received backward loopback cell first, then acquiring a reception time from said time managing means, and reading the turning time written in the backward loopback cell; and delay measuring means for, when the backward loopback cell is received at an end point, calculating a delay time in each of said forward and backward paths on the basis of the transmission time, the turning time, and the reception time notified from said loopback control means, and outputting an alarm signal when each of the calculated delay times is longer than a predetermined reference time.

2. A system according to claim 1, wherein said transmission control means writes information about the turning point in the loopback cell to be transmitted, and said turning control means writes the turning time acquired from said time managing means in the loopback cell, and transmits the cell as the backward loopback cell to one of said backward paths.

3. A system according to claim 2, wherein said turning control means replaces the information about the turning point with the turning time, and returns the backward loopback cell.

4. A system according to claim 1, wherein when the loopback cell and the backward loopback cell are received at the passing point, said relay means writes identification information of the passing point and passing time acquired from said time managing means in unused areas of the loopback cell and the backward loopback cell, and allows the cells to pass therethrough, said reception control means reads the identification information of the passing point and the passing time from the backward loopback cell, and said delay measuring means calculates a delay time in each of said forward and backward paths on the basis of the passing time at each passing point, the transmission time, and the reception time which are notified from said reception control means, and outputs an alarm signal when each of the calculated delay times is longer than a predetermined reference time.

5. A system according to claim 1, wherein said relay control means writes identification information and passing time at the passing point in unused areas of the received loopback cell and the received backward loopback cell as long as the unused areas are available.

6. A loopback cell control system comprising:

first to third ATM apparatuses, each adapted to generate information about a loopback as a loopback cell according to a predetermined format of an ATM cell, and transmitting the loopback cell while controlling transmission/reception, passing, and returning of the cell; and a plurality of forward paths and a plurality of backward paths as transmission paths through which said ATM apparatuses are cascaded, said ATM apparatuses and said transmission paths constituting an ATM network, said loopback cell control system being adapted to perform a loopback test by circulating the loopback cell through a predetermined route in said ATM network once, said first ATM apparatuses including first time managing means for counting the current time, measuring an elapsed time between the transmission of the loopback cell and the reception thereof, and notifying a timeout when the elapsed time exceeds a predetermined reference time, first loopback control means for, when the loopback cell is transmitted to one of said forward paths, acquiring a transmission time from said time managing means, and for, when the backward loopback cell is received, checking validity of the received backward loopback cell first, then acquiring a reception time from said time managing means, and reading turning time written in the backward loopback cell, and delay measuring means for calculating a delay time in each of said forward and backward paths on the basis of the transmission time, the turning time, and the reception time notified from said loopback control means, and outputting an alarm signal when each of the calculated delay times is longer than a predetermined reference time;

said second ATM apparatus including second loopback control means for allowing the received loopback cell and the received backward loopback cell to pass therethrough; and said third ATM apparatus including third loopback control means for writing turning time in the received loopback cell and transmitting the cell as a backward loopback cell to one of said backward paths.

7. A system according to claim 6, wherein said first loopback control means of said first ATM apparatus writes information about said third ATM apparatus at a turning point in the loopback cell to be transmitted.

8. A system according to claim 7, wherein said third loopback control means of said third ATM apparatus replaces the information about said third ATM apparatus at a turning point with the turning time, and returns the backward loopback cell.

9. A system according to claim 6, wherein said third ATM apparatus comprises timer means for counting the current time, and said third loopback control means of said third ATM apparatus writes the turning time acquired from said timer means in the loopback cell and transmits the cell as the backward loopback cell to one of said backward paths.

10. A system according to claim 6, wherein said second ATM apparatus comprises timer means for counting the current time, said second loopback control means of said second ATM apparatus writes identification information of a passing point and passing time acquired from said timer means in unused areas of the loopback cell and the backward loopback cell, and allows the cells to pass therethrough, said first loopback control means of said ATM apparatus reads the identification information of the passing point and the passing time from the backward loopback cell upon reception of the backward loopback cell, and said delay measuring means of said first ATM apparatus calculates a delay time in each of said forward and backward paths on the basis of the transmission time at each passing point, the turning time, and the reception time notified from said first loopback control means, and outputs an alarm signal when each of the calculated delay times is longer than a predetermined reference time.

11. A loopback cell control system comprising:

a plurality of ATM apparatuses, each adapted to generate information about a loopback as a loopback cell according to a predetermined format of an ATM cell, and transmitting the loopback cell while controlling transmission/reception, passing, and returning of the cell; and a plurality of forward paths and a plurality of backward paths as transmission paths through which said ATM apparatuses are cascaded, said ATM apparatuses and said transmission paths constituting an ATM network, said loopback cell control system being adapted to perform a loopback test by circulating the loopback cell through a predetermined route in said ATM network once, and each of said ATM apparatuses including:

a time managing section for counting the current time, measuring an elapsed time between the transmission of the loopback cell and the reception thereof, and notifying a timeout when the elapsed time exceeds a predetermined reference time;

a loopback control section constituted by a transmission control section for, when the loopback cell is transmitted at a start point, transmitting the loopback cell to one of said forward paths and acquiring a transmission time from said time managing section, a turning control section for, when the loopback cell is received at a turning point, writing turning time in the received loopback cell and transmitting the cell as a backward loopback cell to one of the backward paths, a relay control section for, when the loopback cell and the backward loopback cell are received at a passing point, allowing the received loopback cell and the received backward loopback cell to pass therethrough, and a reception control section for, when the backward loopback cell is received at an end point, checking validity of the received backward loopback cell first, then acquiring a reception time from said time managing section, and reading the turning time written in the backward loopback cell; and a delay measuring section for, when the backward loopback cell is received at an end point, calculating a delay time in each of said forward and backward paths on the basis of the transmission time, the turning time, and the reception time notified from said loopback control section, and outputting an alarm signal when each of the calculated delay times is longer than a predetermined reference time.

12. A system according to claim 11, wherein said transmission control section writes information about the turning point in the loopback cell to be transmitted, and said turning control section writes the turning time acquired from said time managing section in the loopback cell, and transmits the cell as the backward loopback cell to one of said backward paths.

13. A system according to claim 12, wherein said turning control section replaces the information about the turning point with the tuning time, and returns the backward loopback cell.

14. A system according to claim 11, wherein when the loopback cell and the backward loopback cell are received at the passing point, said relay section writes identification information of the passing point and passing time acquired from said time managing section in unused areas of the loopback cell and the backward loopback cell, and allows the cells to pass therethrough, said reception control section reads the identification information of the passing point and the passing time from the backward loopback cell, and said delay measuring section calculates a delay time in each of said forward and backward paths on the basis of the passing time at each passing point, the transmission time, and the reception time which are notified from said reception control section, and outputs an alarm signal when each of the calculated delay times is longer than a predetermined reference time.

15. A system according to claim 11, wherein said relay control section writes identification information and passing time at the passing point in unused areas of the received loopback cell and the received backward loopback cell as long as the unused areas are available.

16. A loopback cell control system comprising:

first to third ATM apparatuses, each adapted to generate information about a loopback as a loopback cell according to a predetermined format of an ATM cell, and transmitting the loopback cell while controlling transmnission/reception, passing, and returning of the cell; and a plurality of forward paths and a plurality of backward paths as transmission paths through which said ATM apparatuses are cascaded, said ATM apparatuses and said transmission paths constituting an ATM network, said loopback cell control system being adapted to perform a loopback test by circulating the loopback cell through a predetermined route in said ATM network once, said first ATM apparatuses including:

a first time managing section for counting the current time, measuring an elapsed time between the transmission of the loopback cell and the reception thereof, and notifying a timeout when the elapsed time exceeds a predetermined reference time, a first loopback control section for, when the loopback cell is transmitted to one of said forward paths, acquiring a transmission time from said time managing section, and for, when the backward loopback cell is received, checking validity of the received backward loopback cell first, then acquiring a reception time from said time managing section, and reading turning time written in the backward loopback cell, and a delay measuring section for calculating a delay time in each of said forward and backward paths on the basis of the transmission time, the turning time, and the reception time notified from said loopback control section, and outputting an alarm signal when each of the calculated delay times is longer than a predetermined reference time;

said second ATM apparatus including a second loopback control section for allowing the received loopback cell and the received backward loopback cell to pass therethrough; and said third ATM apparatus including a third loopback control section for writing turning time in the received loopback cell and transmitting the cell as a backward loopback cell to one of said backward paths.

17. A system according to claim 16, wherein said first loopback control section of said first ATM apparatus writes information about said third ATM apparatus at a turning point in the loopback cell to be transmitted.

18. A system according to claim 17, wherein said third loopback control section of said third ATM apparatus replaces the information about said third ATM apparatus at a turning point with the turning time, and returns the backward loopback cell.

19. A system according to claim 16, wherein said third ATM apparatus comprises a timer section for counting the current time, and said third loopback control section of said third ATM apparatus writes the turning time acquired from said timer section in the loopback cell and transmits the cell as the backward loopback cell to one of said backward paths.

20. A system according to claim 16, wherein said second ATM apparatus comprises a timer section for counting the current time, said second loopback control section of said second ATM apparatus writes identification information of a passing point and passing time acquired from said timer section in unused areas of the loopback cell and the backward loopback cell, and allows the cells to pass therethrough, said first loopback control section of said ATM apparatus reads the identification information of the passing point and the passing time from the backward loopback cell upon reception of the backward loopback cell, and said delay measuring section of said first ATM apparatus calculates a delay time in each of said forward and backward paths on the basis of the transmission time at each passing point, the turning time, and the reception time notified from said first loopback control section, and outputs an alarm signal when each of the calculated delay times is longer than a predetermined reference time.

* * * * *

UNITED STATES PATENT AND TRADEMARK OFFICE
CERTIFICATE OF CORRECTION

PATENT NO. : 6,023,455
DATED : February 8, 2000
INVENTOR(S) : Yasunori Takahashi It is certified that error appears in the above-indentified patent and that said Letters Patent is hereby corrected as shown below:

Title page, item [57],

In the Abstract, line 12, delete the second occurrence of "a turning control section".

Column 3. line 47, delete "c" and insert therefor --11c--.

Signed and Sealed this

Tenth Day of April, 2001

*Attest:*

NICHOLAS P. GODICI

*Attesting Officer*   *Acting Director of the United States Patent and Trademark Office*